(12) United States Patent
Zhao et al.

(10) Patent No.: US 12,071,044 B2
(45) Date of Patent: *Aug. 27, 2024

(54) LONG RAIL ASSEMBLY WITH INTERNAL POWER DRIVING SYSTEM

(71) Applicant: Magna Seating Inc., Aurora (CA)

(72) Inventors: Kai Zhao, Novi, MI (US); Detjon Marini, White Lake, MI (US); Louis Vetere, II, Commerce Township, MI (US); Cheikh Dioum, Farmington Hills, MI (US)

(73) Assignee: Magna Seating Inc., Aurora (CA)

( * ) Notice: Subject to any disclaimer, the term of this patent is extended or adjusted under 35 U.S.C. 154(b) by 368 days.

This patent is subject to a terminal disclaimer.

(21) Appl. No.: 17/439,211

(22) PCT Filed: Mar. 16, 2020

(86) PCT No.: PCT/US2020/022908
§ 371 (c)(1),
(2) Date: Sep. 14, 2021

(87) PCT Pub. No.: WO2020/186259
PCT Pub. Date: Sep. 17, 2020

(65) Prior Publication Data
US 2022/0161691 A1 May 26, 2022

Related U.S. Application Data

(60) Provisional application No. 62/818,370, filed on Mar. 14, 2019.

(51) Int. Cl.
*B60N 2/02* (2006.01)
*B60N 2/07* (2006.01)

(52) U.S. Cl.
CPC ......... *B60N 2/02246* (2023.08); *B60N 2/07* (2013.01); *B60N 2/0705* (2013.01); *B60N 2/02253* (2023.08)

(58) Field of Classification Search
None
See application file for complete search history.

(56) References Cited

U.S. PATENT DOCUMENTS

| 4,275,914 A | 6/1981 | Holweg et al. |
| 4,720,073 A * | 1/1988 | Mann ..................... B60N 2/072 248/419 |

(Continued)

FOREIGN PATENT DOCUMENTS

| CN | 203391641 | 1/2014 |
| CN | 104245410 | 12/2014 |

(Continued)

*Primary Examiner* — Gregory A Blankenship
(74) *Attorney, Agent, or Firm* — Miller Canfield (57) ABSTRACT

A long rail assembly for use in a vehicle includes a lower channel, an inverted U-shaped upper channel, a gearbox, a rack, a pinion, a drive shaft, and a motor. The lower channel is adapted to extend longitudinally along a floor of the vehicle. The upper channel is slidably coupled to the lower channel. The gearbox is fixedly secured to and housed within the upper channel. The rack is fixedly coupled to the lower channel and includes gear teeth extending along the rack in a longitudinal direction. The pinion is meshingly engaged with the gear teeth. The drive shaft operatively couples the gearbox to the pinion. The motor is operatively coupled to the gearbox to power drive the upper channel along the lower channel.

13 Claims, 6 Drawing Sheets

(56) References Cited

U.S. PATENT DOCUMENTS

| | | | |
|---|---|---|---|
| 4,909,468 A | 3/1990 | Aihara et al. | |
| 5,094,420 A | 3/1992 | Aihara et al. | |
| 5,150,872 A | 9/1992 | Isomura | |
| 5,323,998 A * | 6/1994 | Aihara | B60N 2/067 |
| | | | 248/419 |
| 6,499,712 B1 | 12/2002 | Clark et al. | |
| 6,691,971 B2 | 2/2004 | Yamada et al. | |
| 7,331,558 B2 | 2/2008 | Jeong | |
| 8,844,891 B2 | 9/2014 | Yamada et al. | |
| 8,904,895 B2 * | 12/2014 | Woehrle | F16H 1/16 |
| | | | 74/425 |
| 10,011,195 B2 | 7/2018 | Kume et al. | |
| 10,562,411 B2 * | 2/2020 | Higuchi | F16H 1/20 |
| 11,148,562 B2 * | 10/2021 | Kondo | B60N 2/42727 |
| 11,485,255 B2 * | 11/2022 | Napau | F16H 25/20 |
| 11,760,233 B2 * | 9/2023 | Napau | B60N 2/0825 |
| | | | 296/65.15 |
| 11,766,956 B2 * | 9/2023 | Napau | B60N 2/06 |
| | | | 297/344.1 |
| 2005/0230591 A1 | 10/2005 | Smith et al. | |
| 2010/0320352 A1 * | 12/2010 | Weber | F16H 25/20 |
| | | | 74/89.23 |
| 2011/0284718 A1 * | 11/2011 | Kimura | B60N 2/0705 |
| | | | 248/560 |
| 2018/0334054 A1 | 11/2018 | Higuchi et al. | |
| 2019/0202322 A1 * | 7/2019 | Napau | B60N 2/0715 |
| 2020/0130538 A1 * | 4/2020 | Emrich | B60N 2/015 |
| 2020/0369178 A1 * | 11/2020 | Maloney | B60N 2/01 |
| 2020/0391668 A1 * | 12/2020 | Dry | B60R 11/00 |
| 2021/0062907 A1 * | 3/2021 | Kuroda | B60N 2/02258 |
| 2021/0138933 A1 * | 5/2021 | Marini | B60N 2/073 |
| 2021/0354598 A1 * | 11/2021 | Xiao | B60N 2/067 |
| 2021/0370804 A1 * | 12/2021 | Zhao | B60N 2/0875 |
| 2022/0017000 A1 * | 1/2022 | Zhao | B60N 2/06 |
| 2022/0024355 A1 * | 1/2022 | Napau | B60N 2/02246 |
| 2022/0080862 A1 * | 3/2022 | Simms | B60N 2/067 |
| 2022/0161691 A1 * | 5/2022 | Zhao | B60N 2/07 |
| 2022/0219569 A1 * | 7/2022 | Zhao | B60N 2/08 |
| 2022/0340051 A1 * | 10/2022 | Vandenheede | B60N 2/0818 |
| 2022/0396179 A1 * | 12/2022 | Zhao | B60N 2/0715 |
| 2023/0062149 A1 * | 3/2023 | Zhao | B60N 2/01508 |
| 2023/0294564 A1 * | 9/2023 | Zhao | B60N 2/06 |
| | | | 248/429 |
| 2023/0294565 A1 * | 9/2023 | Li | B60N 2/0705 |
| | | | 296/65.13 |

FOREIGN PATENT DOCUMENTS

| | | | | |
|---|---|---|---|---|
| CN | 104507363 | | 4/2015 | |
| CN | 109050353 | | 12/2018 | |
| CN | 109050353 A | * | 12/2018 | B60N 2/0232 |
| CN | 208306408 | | 1/2019 | |
| CN | 110626224 | | 12/2019 | |
| FR | 2510952 | | 2/1983 | |
| JP | S63147331 | | 9/1988 | |
| KR | 100803305 | | 2/2008 | |
| KR | 101034307 | | 5/2011 | |
| WO | 2019011667 | | 1/2019 | |

* cited by examiner

LONG RAIL ASSEMBLY WITH INTERNAL POWER DRIVING SYSTEM

CROSS-REFERENCE TO RELATED APPLICATIONS

This application claims priority to and all the benefits of U.S. Provisional Patent Application No. 62/818,370, filed Mar. 14, 2019, and entitled "Long Rail Assembly with Internal Power Driving System," the disclosure of which is hereby incorporated by reference in its entirety.

BACKGROUND OF THE INVENTION

1. Field of the Invention

The present invention relates to a long rail assembly that adjusts a seat assembly's position within a vehicle.

2. Description of Related Art

Many vehicles today have systems that give seats the capability of power adjustment. For example, adjustable seat assemblies in vehicles incorporate various parts that take the mechanical energy generated by a motor and use it to move the seat. These systems include gearboxes, racks, pinions and other mechanical parts that are often integrated with the floor of the vehicle's interior. Often times dirt or debris brought into the vehicle collect on the floor and within these systems. The buildup of dirt and debris can cause these systems to become less efficient or simply stop working altogether. It is desirable to have a system capable of power adjustment wherein the mechanical parts are mostly sheltered from this eventual buildup.

SUMMARY OF THE INVENTION

According to one embodiment, there is provided a long rail assembly for use in a vehicle comprising a lower channel, an inverted U-shaped upper channel, a gearbox, a rack, a pinion, a drive shaft, and a motor. The lower channel is adapted to extend longitudinally along a floor of the vehicle. The upper channel is slidably coupled to the lower channel. The gearbox is fixedly secured to and housed within the upper channel. The rack is fixedly coupled to the lower channel and includes gear teeth extending along the rack in a longitudinal direction. The pinion is meshingly engaged with the gear teeth. The drive shaft operatively couples the gearbox to the pinion. The motor is operatively coupled to the gearbox to power drive the upper channel along the lower channel.

According to another embodiment, there is provided a long rail assembly for use in a vehicle comprising a lower channel, an upper channel, a plurality of gears, a rack, a pinion, a drive shaft, and a motor. The lower channel is adapted to extend longitudinally along a floor of the vehicle. The lower channel includes opposing sidewalls, a bottom wall and a top wall extending between the opposing sidewalls. The top wall has an elongated opening extending in a longitudinal direction. The upper channel is slidably coupled to the lower channel. The plurality of gears is operatively coupled to the upper channel. The rack is fixedly coupled to the top wall of the lower channel and includes gear teeth extending along the rack in a longitudinal direction. The gear teeth are oriented toward the bottom wall of the lower channel. The pinion is meshingly engaged with the gear teeth. The drive shaft operatively couples the plurality of gears to the pinion. Finally, the motor is operatively coupled to the plurality of gears to power drive the upper channel along the lower channel.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

Figure 1:
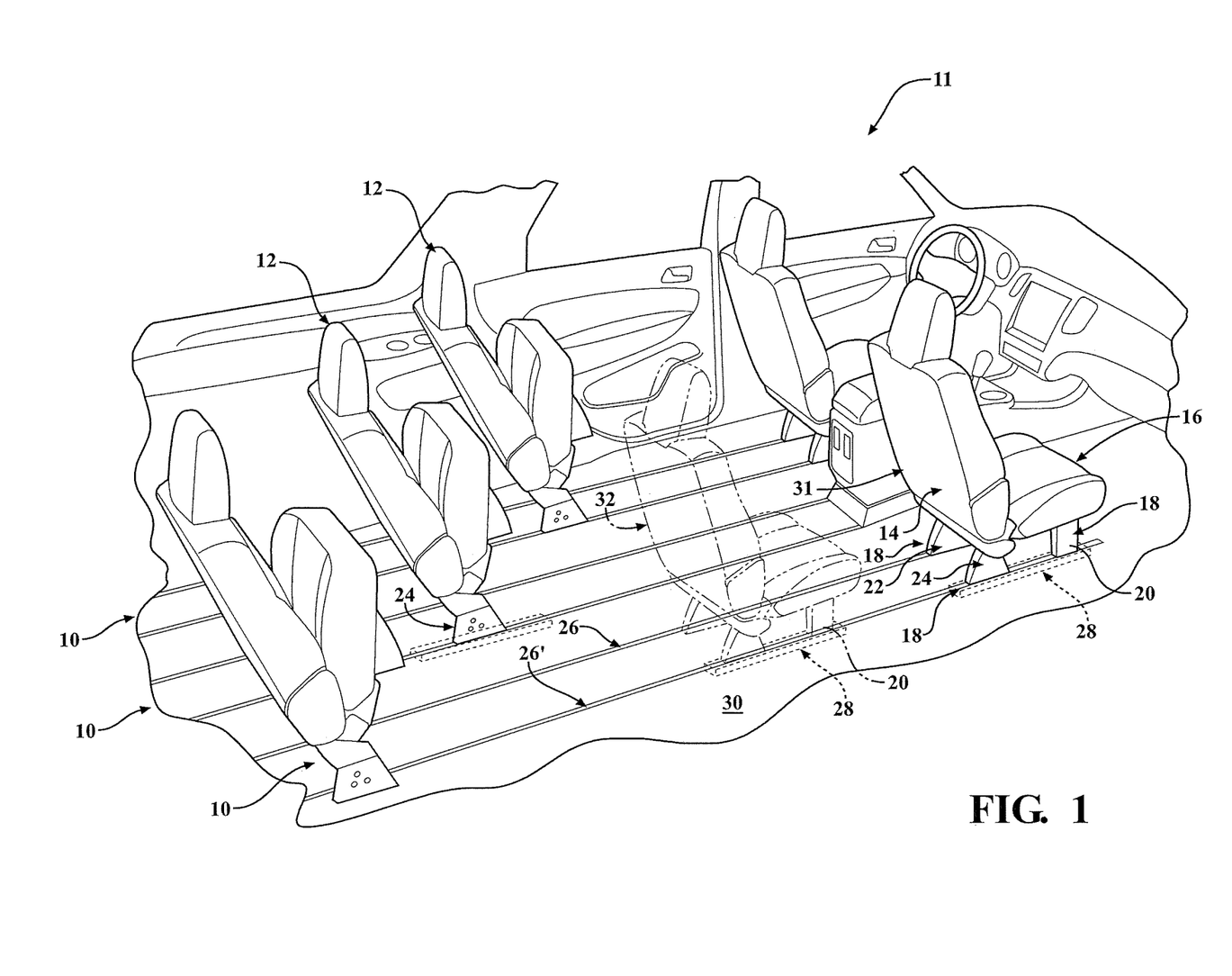
FIG. 1 is a fragmentary perspective view of a seat assembly and a long rail assembly in a vehicle interior according to one embodiment of the present invention.

FIG. 1 illustrates an interior 11 of a vehicle with a plurality of long rail assemblies 10 configured to reposition a plurality of seat assemblies 12 along a floor 30 of the vehicle according to embodiments described herein. Each seat assembly 12 includes a seat cushion 16 and a seat back 14 operatively coupled to the seat cushion 16 for supporting a seat occupant in a generally upright seating position. Each seat assembly 12 also includes a mounting structure 18 that supports the seat cushion 16 above the vehicle floor 30. The mounting structure 18 includes a pair of rear legs 22, 24, and may also include front legs 20.

Each long rail assembly 10 includes a pair of U-shaped lower channels 26, 26' adapted to be fixedly secured to the vehicle floor 30 and a plurality of rail drive assemblies 28 that are configured to travel along the U-shaped lower channels 26, 26'. The mounting structure 18 of the seat assembly 12 is adapted to be fixedly secured to the rail drive assembly 28. The seat assembly 12 may be adjusted among a plurality of fore/aft seating positions along the vehicle floor 30. For example, the seat assembly 12 may be repositioned from a first seat location 31 to a second seat location 32 by sliding the rail drive assembly 28 that is secured to the seat assembly 12 along the U-shaped lower channels 26, 26'. Although described in terms of the components for the inboard long rail assembly, the present invention includes corresponding structures on the outboard long rail assembly represented by like primed reference numerals. Additional details regarding long rail assemblies for use in automotive vehicles are fully set forth in Applicant's application no. PCT/US19/62212, entitled "Removable Seat Used with a Long Rail Assembly," filed Nov. 19, 2019, and application no. PCT/US19/55835, entitled "Long Rail Assembly for Vehicle Seat Adjustment," filed Oct. 11, 2019, the disclosures of which are hereby incorporated by reference in their entirety.

Referring to FIGS. 2, 3, 4 and 6, the U-shaped lower channel 26 includes opposing sidewalls 40, 41 a top wall 42 and a bottom wall 44 extending between the opposing sidewalls 40, 41. The top wall 42 includes an elongated opening 46 extending in a longitudinal direction. Each sidewall 40, 41 of the lower channel 26 is bent into a C-shaped cross-section in profile to form tracks 48, 49 respectively. The bottom wall 44 of the lower channel 26 is configured to be fixedly attached to the vehicle floor 30.

Referring to FIGS. 2-6, the rail drive assembly 28 includes an inverted U-shaped upper channel 58 slidably coupled to the lower channel 26. The upper channel 58 includes a pair of opposing sidewalls 80, 81 and a top wall 82 extending therebetween. The rail drive assembly 28 also includes stability rollers 64 projecting from the sidewalls 80, 81 of the upper channel 58 and a torsion spring 92 to bias the stability rollers 64 against the respective sidewalls 40, 41 of the lower channel 26. The stability rollers 64 may project from the sidewalls 80, 81 at an angle to counteract both vertical and lateral tolerance variations between the upper channel 58 and the lower channel 26 within the long rail assembly 10.

The rail drive assembly 28 further includes front and rear axles 60, 62 operatively coupled to the side walls 80, 81 of the upper channel 58 and opposing wheels 110 that are coupled to the ends of each axle 60, 62. The wheels 110 are configured to travel along the tracks 48, 49 of the lower channel 26.

Figure 2:
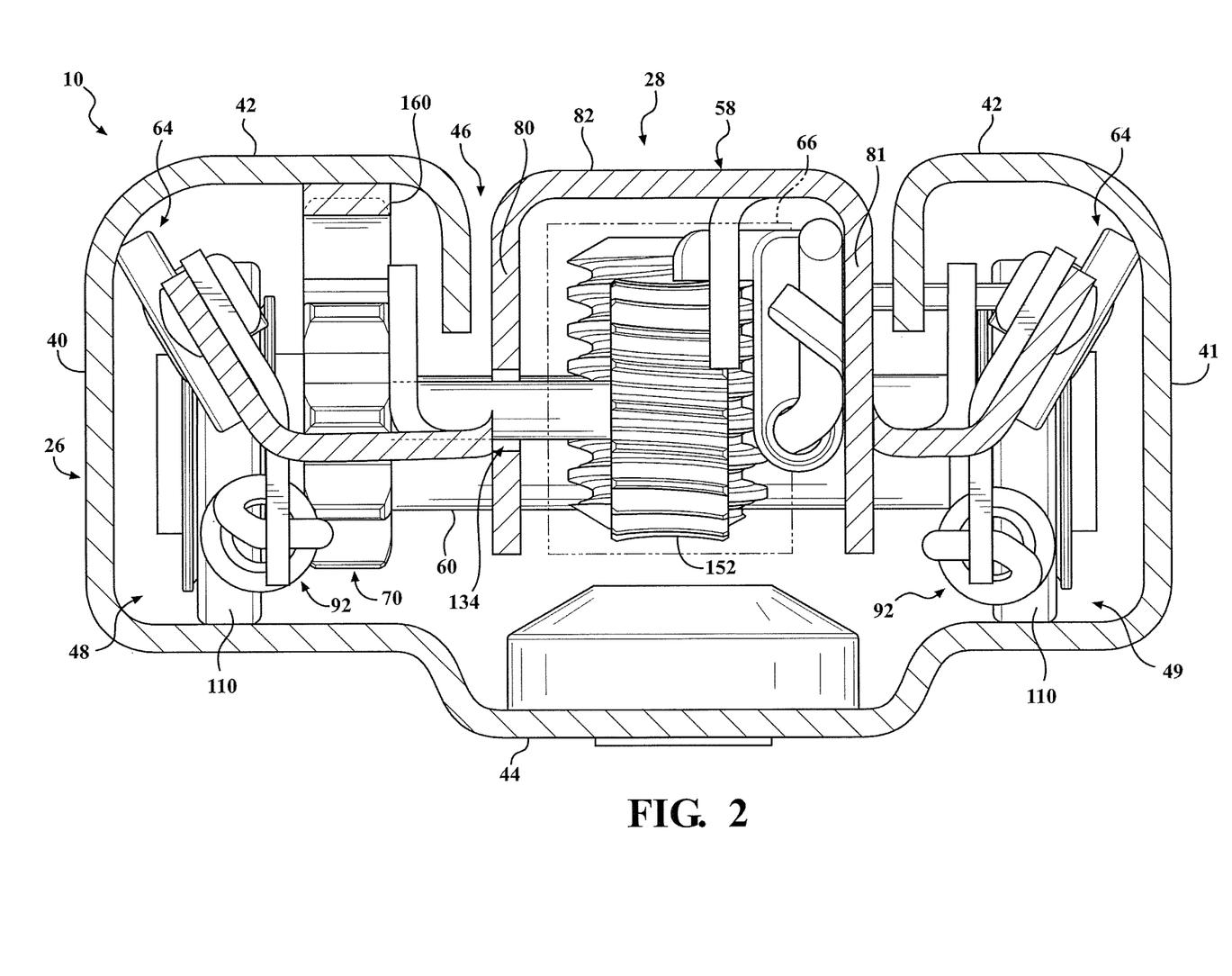
FIG. 2 is an end view of the long rail assembly according to one embodiment of the present invention.
Figure 3:
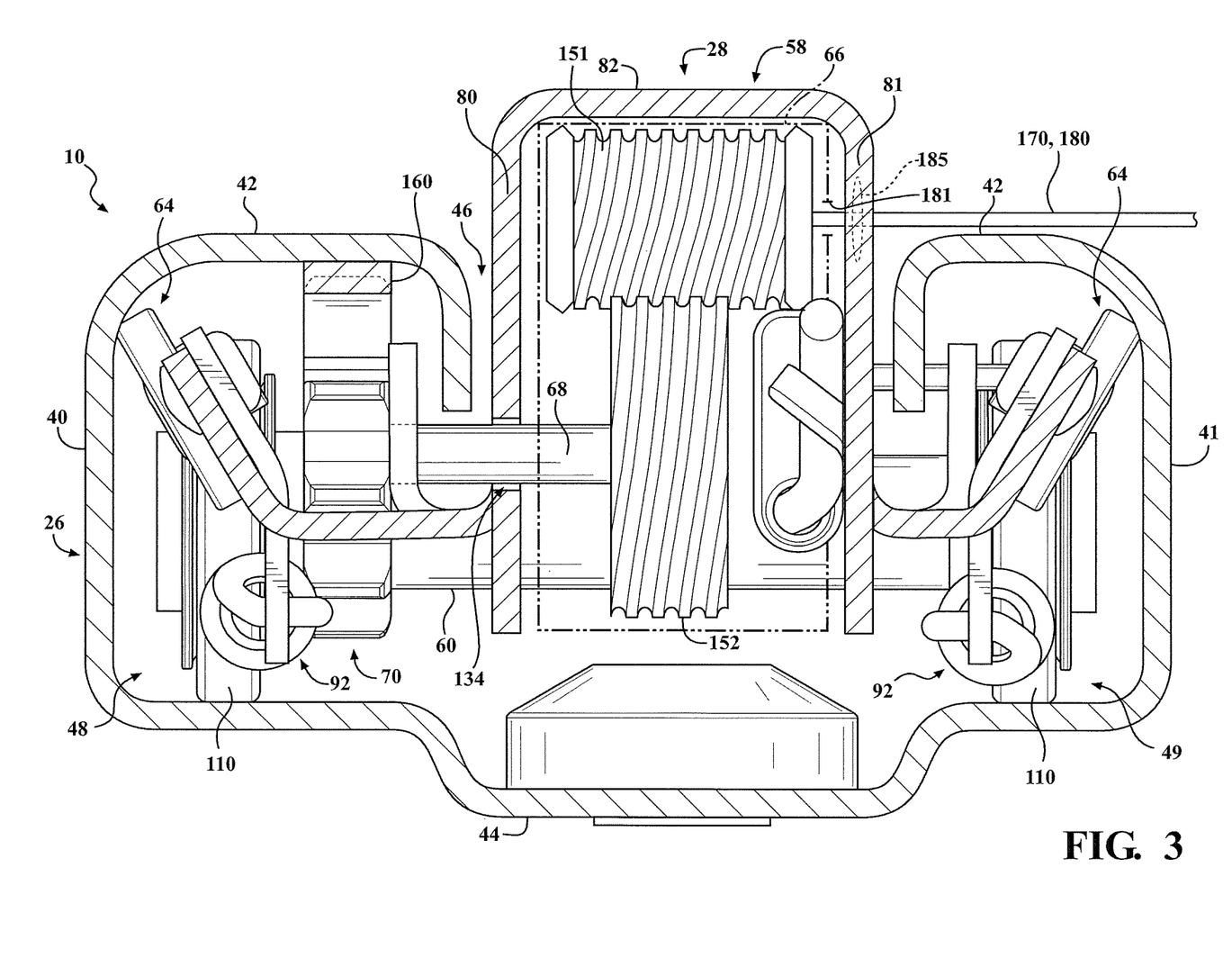
FIG. 3 is an end view of the long rail assembly according to one embodiment of the present invention.
Figure 5:
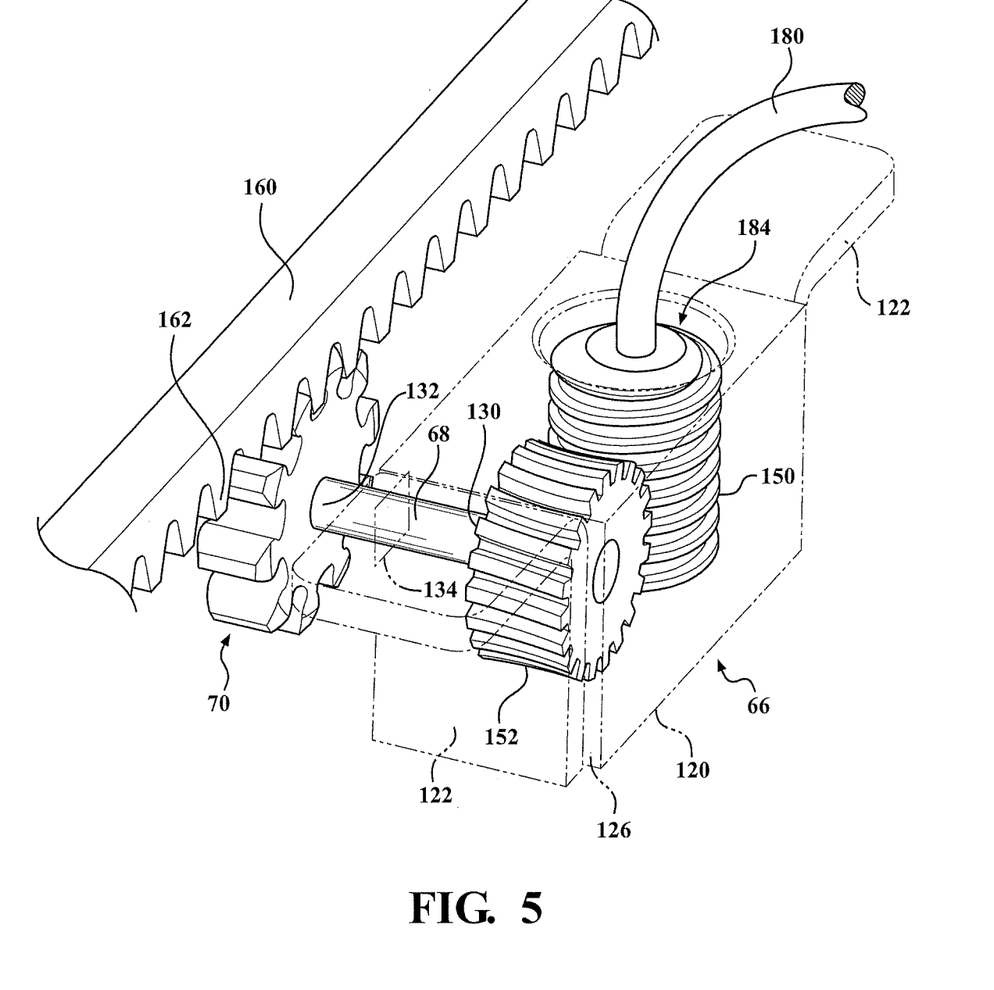
FIG. 5 is a partially transparent perspective view of an internal power driving system of the long rail assembly according to one embodiment of the present invention.

Referring to FIGS. 2 and 5 the rail drive assembly 28 further includes a gearbox 66 fixedly secured to and housed within the upper channel 58. The gearbox 66 includes a vertically oriented worm gear 150 meshingly engaged with a worm wheel 152 within a gearbox housing 120. A mounting structure 122 is fixedly attached to an outer surface 126 of the gearbox housing 120 and mounts the gearbox 66 to the top wall 82 of the upper channel 58 via bolts, rivets, fasteners, or welds. In an alternative embodiment shown in FIG. 3, the side walls 80, 81 of the upper channel 58 may extend above the height of the top wall 42 of the lower channel 26. The taller upper channel 58 creates enough space for a horizontally oriented worm gear 151. The horizontally oriented worm gear 151 is meshingly engaged with the worm wheel 152 within the gearbox housing 120. The horizontal orientation of the worm gear 151 allows for alternative packaging arrangements as will be discussed further hereinbelow.

The rail drive assembly 28 also includes a drive shaft 68 and a pinion 70. A first end 130 of the drive shaft 68 is fixedly coupled to the worm wheel 152, and an opposite second end 132 of the drive shaft 68 is fixedly coupled to the pinion 70. The drive shaft 68 extends out of the gearbox 66 through an opening 134 in the sidewall 80 of the upper channel 58.

Referring to FIGS. 2-6, the long rail assembly 10 further includes a rack 160 fixedly coupled to the top wall 42 of the lower channel 26. The rack 160 includes a plurality of generally equally spaced apart gear teeth 162 extending along the length of the rack 160 in a longitudinal direction. The gear teeth 162 are oriented towards or facing the bottom wall 44 of the lower channel 26. The pinion 70 is oriented in a vertical position to meshingly engage with the gear teeth 162 of the rack 160.

The gearbox 66, the rack 160 and pinion 70, are packaged inside the long rail assembly 10 to conceal it from any dirt and debris that may accumulate on the vehicle floor 30. In particular, because the gearbox 66 is mounted within the upper channel 58, the upper channel 58 will prevent any dirt or debris from falling directly into gearbox 66. Similarly, because the rack 160 is mounted within the lower channel 26 and the gear teeth 162 of the rack 160 are facing downward, any dirt or debris that enters the lower channel 26 will not settle on the gear teeth 162. Moreover, because the gearbox 66, the rack 160 and the pinion 70 are elevated above the bottom wall 44 of the lower channel 26, they are not likely to collect any dirt or debris that may accumulate in the lower channel 26.

Figure 4:
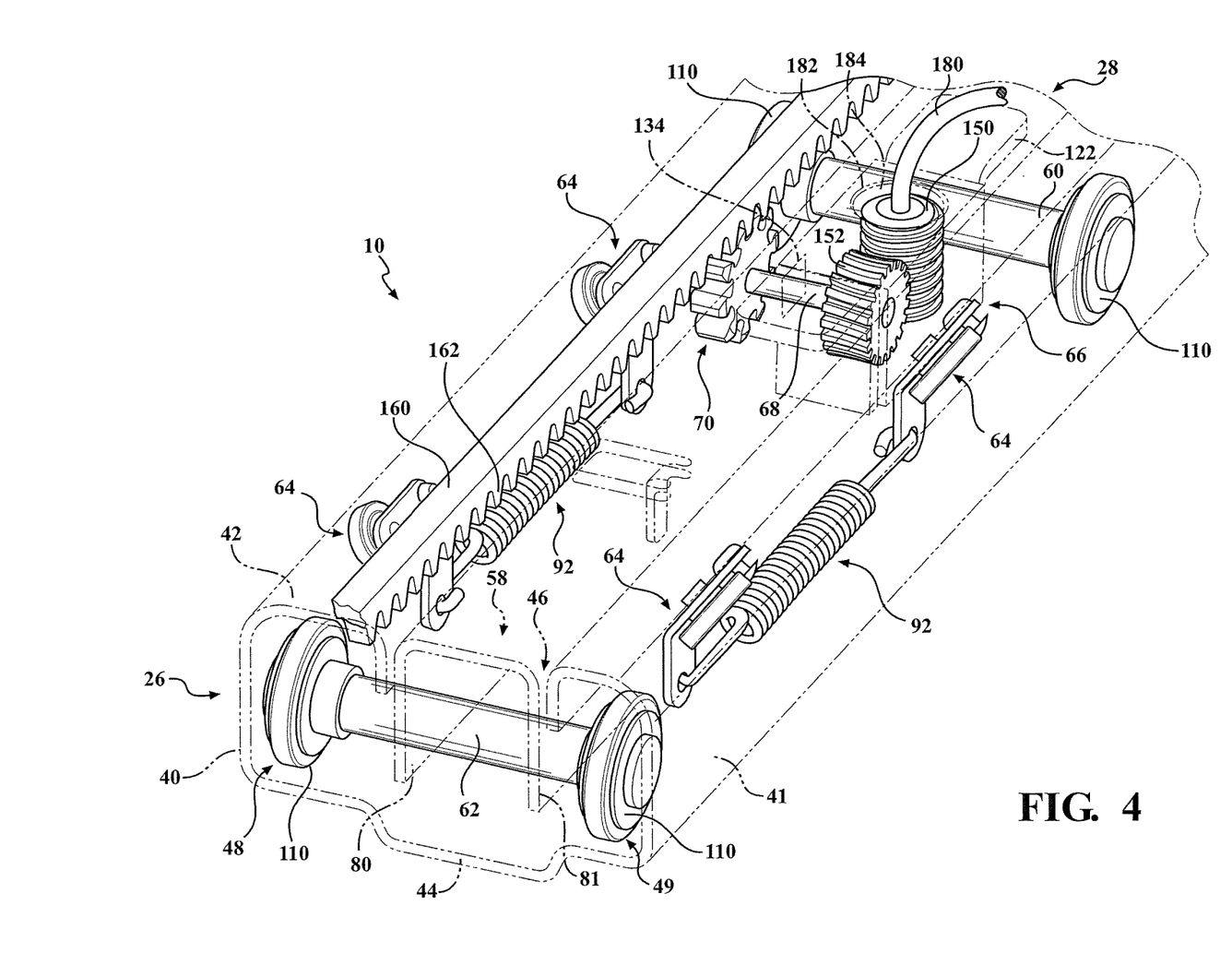
FIG. 4 is a partially transparent perspective view of the long rail assembly according to an alternative embodiment of the present invention.
Figure 6:
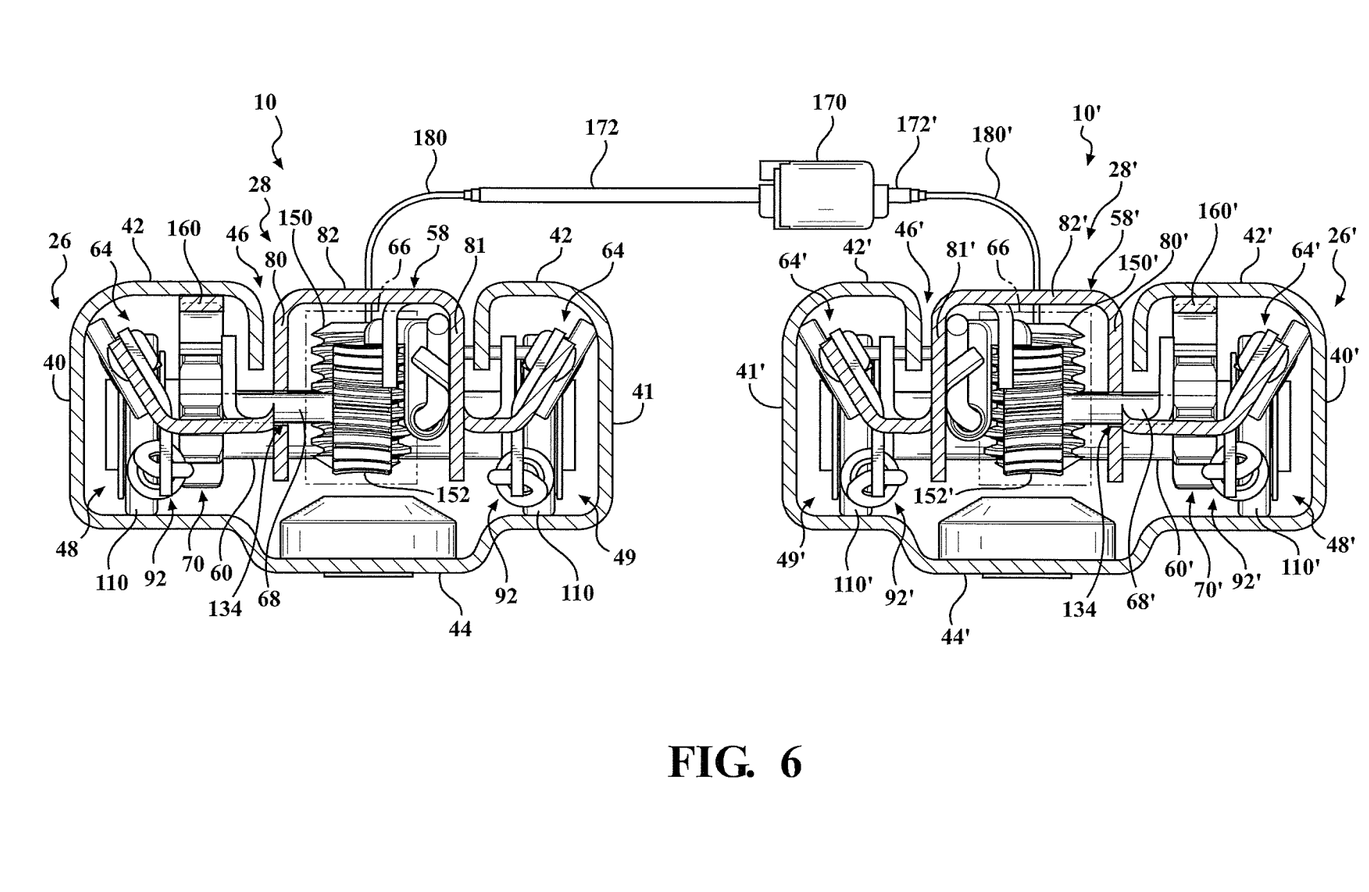
FIG. 6 is an end view of a motor and the long rail assembly according to one embodiment of the present invention.

Referring to FIGS. 4-6, the long rail assembly 10 further includes an electric motor 170. A flexible shaft 180 operatively couples an output shaft 172 of the motor 170 to the worm gear 150. The flexible shaft 180 extends from the output shaft 172 through an opening 182 in the top wall 82 of the upper channel 58 and an opening 184 in the gearbox 66 to the vertically oriented worm gear 150. In the alternative embodiment of FIG. 3, the flexible shaft 180 extends from the output shaft 172 through an opening 185 in either of the side walls 80, 81 of the upper channel 58 and an opening 187 in the gearbox 66 to the horizontally oriented worm gear 151. This alternative arrangement eliminates some of the bends in the flexible shaft 180 thereby increasing the efficiency and torque of the motor 170. In yet another embodiment, the output shaft 172 of the motor 170 can extend directly to the horizontally oriented worm gear 151 through the opening 185 in the upper channel and the opening 187 in the gearbox 66 eliminating the need for the flexible shaft 180 altogether. The motor 170 may be mounted anywhere on the seat assembly 12. For example, the motor 170 may be mounted to the bottom of the seat cushion 16. The motor 170 preferably includes two output shafts 172 to allow a single motor 170 to provide power to both rail drive assemblies 28, 28'. Alternatively, each rail drive assembly 28, 28' may be powered by separate motors 170.

In operation, when the motor 170 is energized to rotate in a first rotational direction, the output shaft 172 rotates the flexible shaft 180 causing the worm gear 150, 151 to rotate. Rotation of the worm gear 150, 151 is transferred to the worm wheel 152 through their meshing engagement. The drive shaft 68 transfers the rotation of the worm wheel 152 to the pinion 70. The rotation of the pinion 70 along the rack 160 transposes the rail drive assembly 28 along the lower channel 26, thereby moving the seat assembly 12 along the long rail assembly 10 in a first direction. Reversing the rotational direction of the motor 170 results in the pinion 70 rotating in an opposite direction along the rack 160, thus moving the rail drive assembly 28 and the corresponding seat assembly 12 along the lower channel 26 in an opposite direction. Finally, pulse width modulation of the motor 170 may provide a more comfortable adjustment speed when the seat assembly 12 is occupied, and a quicker adjustment speed when the seat assembly 12 is unoccupied.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:
1. A long rail assembly for use in a vehicle comprising:
a lower channel adapted to extend longitudinally along a floor of the vehicle, wherein the lower channel includes opposing sidewalls and a bottom wall and a top wall extending between the opposing sidewalls, and wherein the top wall has an elongated opening extending in a longitudinal direction;

an inverted U-shaped upper channel slidably coupled to the lower channel, wherein the upper channel includes opposing sidewalls and a top wall extending between the opposing sidewalls;

a gearbox fixedly secured to the top wall of the upper channel between the sidewalls and housed within the upper channel;

a rack fixedly coupled to the top wall of the lower channel, wherein the rack includes gear teeth extending along the rack in a longitudinal direction and oriented toward the bottom wall of the lower channel;

a pinion meshingly engaged with the gear teeth;

a drive shaft operatively coupling the gearbox to the pinion; and a motor operatively coupled to the gearbox to power drive the upper channel along the lower channel.

2. The long rail assembly as set forth in claim 1 wherein the gearbox comprises a housing, a worm wheel and a worm gear, wherein the worm wheel is meshingly engaged with the worm gear, and the worm wheel and worm gear are housed within the housing.

3. The long rail assembly as set forth in claim 2 wherein the drive shaft operatively couples the worm wheel to the pinion.

4. The long rail assembly as set forth in claim 3 further comprising a flexible drive shaft operatively coupling the motor to the gearbox.

5. The long rail assembly as set forth in claim 4 wherein rotational output from the motor leads to transpositional rotation of the pinion along the rack to slide the upper channel along the lower channel.

6. A long rail assembly for use in a vehicle comprising:
   a lower channel adapted to extend longitudinally along a floor of the vehicle, wherein the lower channel includes opposing sidewalls, a bottom wall and a top wall extending between the opposing sidewalls, wherein the top wall has an elongated opening extending in a longitudinal direction;
   an upper channel slidably coupled to the lower channel;
   a plurality of gears operatively coupled to the upper channel;
   a rack fixedly coupled to the top wall of the lower channel, wherein the rack includes gear teeth extending along the rack in a longitudinal direction and the gear teeth are oriented toward the bottom wall of the lower channel;
   a pinion meshingly engaged with the gear teeth;
   a drive shaft operatively coupling the plurality of gears to the pinion; and
   a motor operatively coupled to the plurality of gears to power drive the upper channel along the lower channel.

7. The long rail assembly as set forth in claim 6 wherein the plurality of gears are housed within a housing and the housing is fixedly secured to the upper channel.

8. The long rail assembly as set forth in claim 7 wherein the upper channel includes opposing sidewalls and a top wall extending between the opposing sidewalls and the housing is secured to the top wall of the upper channel.

9. The long rail assembly as set forth in claim 8 further comprising a flexible drive shaft operatively coupling the motor to the plurality of gears.

10. The long rail assembly as set forth in claim 9 wherein the plurality of gears comprises a worm wheel meshingly engaged with a worm gear.

11. The long rail assembly as set forth in claim 10 wherein the drive shaft operatively couples the worm wheel to the pinion.

12. The long rail assembly as set forth in claim 11 wherein rotational output from the motor leads to transpositional rotation of the pinion along the rack to slide the upper channel along the lower channel.

13. A long rail assembly for use in a vehicle comprising:
   a lower channel adapted to extend longitudinally along a floor of the vehicle, wherein the lower channel includes opposing sidewalls and a bottom wall and a top wall extending between the opposing sidewalls, and wherein the top wall has an elongated opening extending in a longitudinal direction;
   an inverted U-shaped upper channel slidably coupled to the lower channel, wherein the upper channel includes opposing sidewalls and a top wall extending between the opposing sidewalls;
   a gearbox fixedly secured to and housed within the upper channel;
   a rack fixedly coupled to the top wall of the lower channel the lower channel, wherein the rack includes gear teeth extending along the rack in a longitudinal direction and oriented toward the bottom wall of the lower channel;
   a pinion meshingly engaged with the gear teeth;
   a drive shaft operatively coupling the gearbox to the pinion; and
   a motor operatively coupled to the gearbox to power drive the upper channel along the lower channel.

* * * * *